United States Patent [19]

Kato

[11] Patent Number: 5,018,680
[45] Date of Patent: May 28, 1991

[54] TAPE REEL OF A CASSETTE TAPE

[75] Inventor: Akira Kato, Mito, Japan

[73] Assignee: Victor Company of Japan, Ltd., Yokohama, Japan

[21] Appl. No.: 395,458

[22] Filed: Aug. 18, 1989

[30] Foreign Application Priority Data

Aug. 19, 1988 [JP] Japan .............................. 63-109365[U]

[51] Int. Cl.$^5$ .............................................. B65H 75/14
[52] U.S. Cl. ..................................... 242/71.8; 242/199
[58] Field of Search ...................... 242/71.8, 68.5, 197, 242/198, 199, 200

[56] References Cited

U.S. PATENT DOCUMENTS

| | | | |
|---|---|---|---|
| 4,452,404 | 6/1984 | Gelardi et al. | 242/71.8 |
| 4,564,156 | 1/1986 | Cybulski | 242/199 X |
| 4,846,419 | 7/1989 | Tateno et al. | 242/71.8 |

Primary Examiner—John M. Jillions
Attorney, Agent, or Firm—Fleit, Jacobson, Cohn, Price, Holman & Stern

[57] ABSTRACT

A tape reel for cassette tape including: a hub; a pivot placed concentrically on a top face of the hub and having a head portion and a circumferential flange projecting radially outwards from the head portion, the head portion being adapted to be urged toward the top face of the hub by a leaf spring mounted to a casing of the cassette tape; a pivot holder, formed with a top face of the hub, for resiliently holding the circumferential flange of the pivot so that the pivot is placed concentrically on the top face of the hub; and an upper flange having a center hole formed therethrough, the upper flange being joined to the top face of the hub so that the head portion of the pivot passes through the center hole.

4 Claims, 3 Drawing Sheets

TAPE REEL OF A CASSETTE TAPE

BACKGROUND OF THE INVENTION

1. Field of the Invention

The present invention relates to a tape reel of a cassette tape such as video cassette tape.

2. Prior Art

FIG. 5 illustrates an axial section of a central portion of a conventional tape reel, in which reference numerals 10 and 12 designate a hub and an upper flange of the tape reel, respectively. The hub 10 and the upper flange 12 are formed of a synthetic resin. The reference numeral 14 indicates a leaf spring mounted at one end to a cassette casing (not shown) for urging at the other end a pivot 16 which is integrally formed with the center of the upper face 18 of the hub 10.

There is a possibility of wearing of the pivot 16 by the leaf spring 14 since the tape reel is rotated at a high speed during traveling of the tape. To reduce this possibility, a polyacetal resin which is excellent in wear resistance is used for the hub 10. Polyacetal resins are however poor in molding productivity and expensive as compared to styrene resins.

For these reasons, an attempt has been made in which a hub 20 is made of a styrene resin, and a separate pivot 22, made of a polyacetal resin, is placed concentrically on the top face of the hub 20 as illustrated in FIGS. 6(A) and 6(B). The pivot 22 includes a head portion 23 and a circumferential flange 25 projecting radially outwards from the lower end of the head portion 23. The pivot 22 is sandwiched at its circumferential flange 25 between the hub 20 and an upper flange 24 for holding it in position. More specifically, the upper flange 24 has an inverted, generally funnel-shaped center through hole 27 formed through it and a rim 24B defining an upper wall 24A of the center through hole 27. The circumferential flange 25 of the pivot 22 is sandwiched between the rim 24B of the upper flange 24 and the top face of the hub 20. The pivot 22 is urged at its head portion 23 toward the top face of the hub 20 by the leaf spring 14. The pivot 22 is small in volume as compared to the hub 20 and hence use of a polyacetal resin for the hub 20 does not considerably affect both the productivity and the cost of the tape reel.

For assembling the tape reel of FIG. 6, firstly the pivot 22 is placed concentrically on the top face of the hub 20, secondly the upper flange 24 is disposed over the top face of the hub 20 so as to sandwich the pivot 22, and finally the hub 20 and the upper flange 24 are joined together by ultrasonic welding. During handling of the hub 20 with the pivot 22 on it for assembling it to the upper flange 24 in the assembly line, the pivot 22 is liable to slip out of the hub 20 and be lost or to dislodge from the concentric position of the hub 20.

For solving such problems during transportation of the hub with a pivot, other attempts have been made in which pivots are temporarily secured to respective hubs by resiliently holding the former to the latter.

One typical attempt is shown in FIGS. 7A and 7B, in which the hub 26 is provided at the center of its top face with an axial through hole 28, into which is resiliently fitted a boss 32 of a pivot 30. The provision of the axial through hole 28 does not pose a problem in fitting of the boss 32 of the pivot 30 but it raises a problem to the molding of the hub 26: that is, for producing the hub 26 it would be necessary to provide a gate on the mold for injecting a molten resin from the center portion of the mold with respect to the hub 26 but it is not possible to do so in the presence of the axial through hole 28.

In the prior art tape reel in FIGS. 8A and 8B, a hub 34 is provided on its top face with a boss 36, and a pivot 38 has a blind hole 40 formed on the bottom face thereof. The shape of the hub 34 requires a draft (taper for removing a work from tis mold) to be provided to the circumferential face of the boss 36 for molding the hub 34 whereas another draft must be provided to the inner circumferential face of the blind hole 40 of the pivot 38 as well. When the boss 36 is fitted into the blind hole 40, no clutching effect is produced because of the two drafts of same orientation, and thus holding the pivot 38 on the hub 34 is not secure. In addition, it is not easy to examine by visual inspection whether or not the pivot 38 is securely fitted around the boss 36.

Accordingly, it is an object of the present invention to provide a tape reel of a cassette tape which solves the above-mentioned problems.

SUMMARY OF THE PRESENT INVENTION

In view of this and other objects in view, the present invention provides a tape reel for a cassette tape including: a hub made of a synthetic resin; a pivot concentrically placed on a top face of the hub and having a head portion and a circumferential flange projecting radially outwards from the head portion, the head portion being adapted to be urged toward the top face of the hub by a leaf spring mounted to a cassette casing; a pivot holder, formed with a top face of the hub, for resiliently holding the circumferential flange of the pivot so that the pivot is placed concentrically on the top face of the hub; and an upper flange having a center hole formed therethrough, the upper flange being joined to the top face of the hub so that the head portion of the pivot passes through the center hole.

BRIEF DESCRIPTION OF THE DRAWINGS

The present invention will be described by way of example with reference to the drawings in which.

DETAILED DESCRIPTION OF THE PREFERRED EMBODIMENTS

Figure 1A:
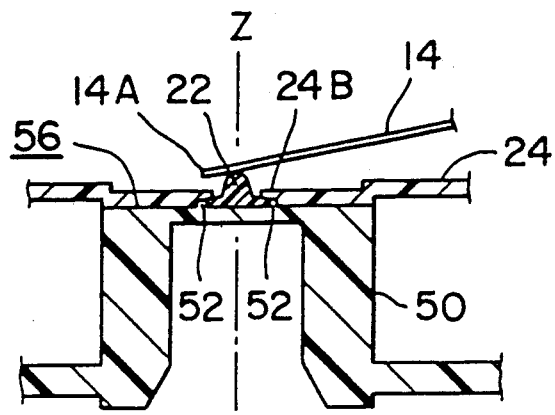
FIG. 1A is an axial cross-section of a central portion of a tape reel according to the present invention.
Figure 1B:
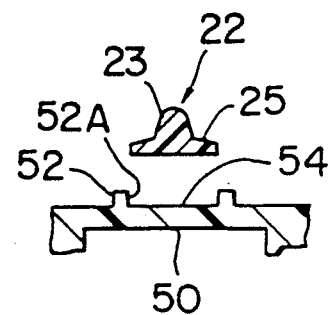
FIG. 1B is an exploded view of the pivot and the central portion of the hub in FIG. 1A.
Figure 6A:
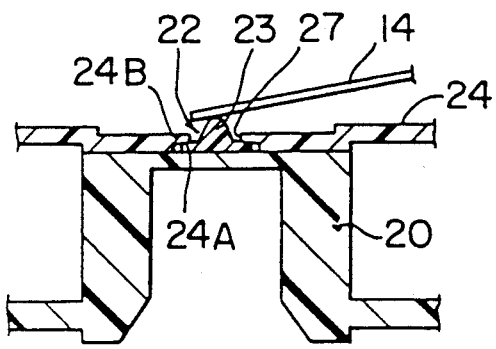
FIG. 6A is an axial cross-sections of the central portion of another tape reel according to the prior art with a separate pivot.
Figure 6B:
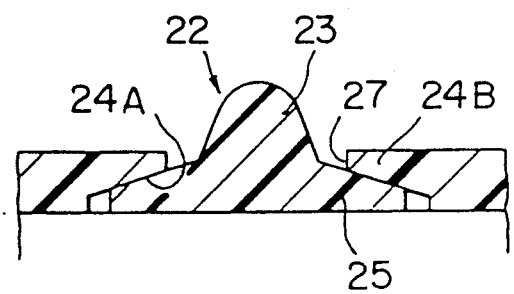
FIG. 6B is an enlarged axial cross-sectional view of the pivot shown in FIG. 6A.
Figure 7A:
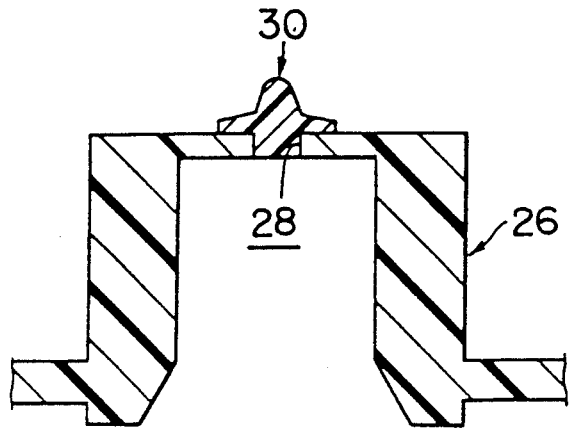
FIG. 7A is an axial cross-sectional view of the central portion of a hub of a still another prior art tape reel, in which the pivot is resiliently fitted into a through hole of the hub.
Figure 7B:
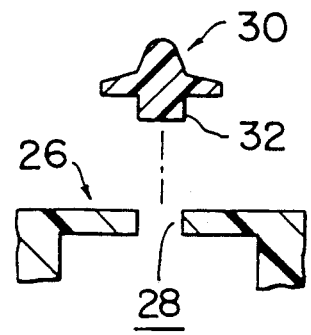
FIG. 7B is an exploded view of the pivot and the top plate of the central portion of the hub in FIG. 7A.
Figure 8A:
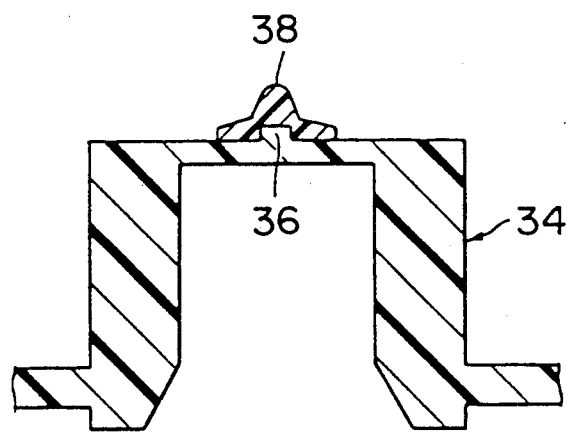
FIG. 8A is an axial cross-sectional view of the central portion of a hub of another prior art tape reel, in which the pivot is resiliently fitted around a boss of the hub.
Figure 8B:
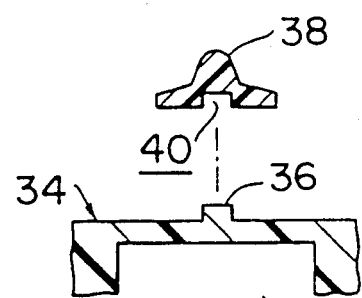
FIG. 8B is an exploded view of the pivot and the top plate of the central portion of the hub in FIG. 8A.

FIGS. 1A and 1B illustrate one embodiment of the present invention, in which parts which correspond to parts in FIG. 6 are designated by like reference numerals and descriptions thereof are omitted. The tape reel of this embodiment includes a hollow cylindrical hub 50 having an annular projection 52 concentrically formed at the top face 56 thereof to axially project from the top face 56. The circumferential flange 25 of the pivot 22 is resiliently fitted into the annular projection 52 for temporary fastening of the pivot 22 to be concentric with the hub 50. Then, the upper flange 24 is lodged over the top face 56 of the hub 50 so that the circumferential flange 25 of the pivot 22 is sandwiched between the bottom flange 24B of the upper flange 24 and the top face 56 of the hub 50. Then, the upper flange 24 is welded to the top face 56 of the hub 50 by ultrasonic welding. In practice, the tape reel thus assembled is urged downwards at its pivot 22 by the distal end 14A of the leaf spring 14.

With such a simple annular projection 52, the pivot 22 is positively fastened to the hub 50 for temporary attachment. Whether or not the circumferential flange 25 is sufficiently fitted into the annular projection 52 can be examined by visual inspection.

Figure 2:
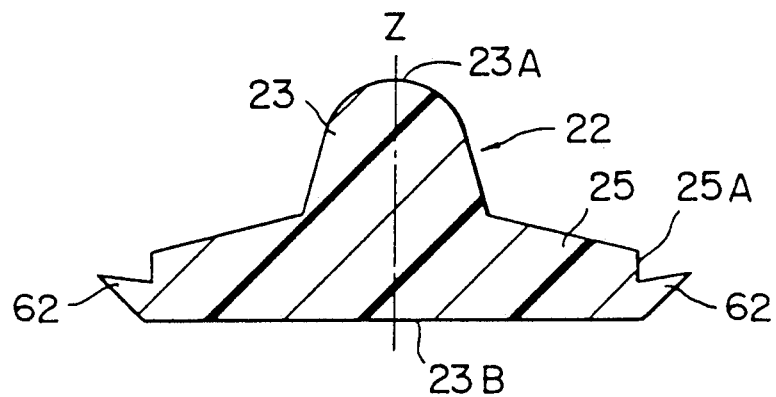
FIG. 2 is an enlarged axial cross-sectional view of a modified form of the pivot in FIG. 1A.
Figure 3:
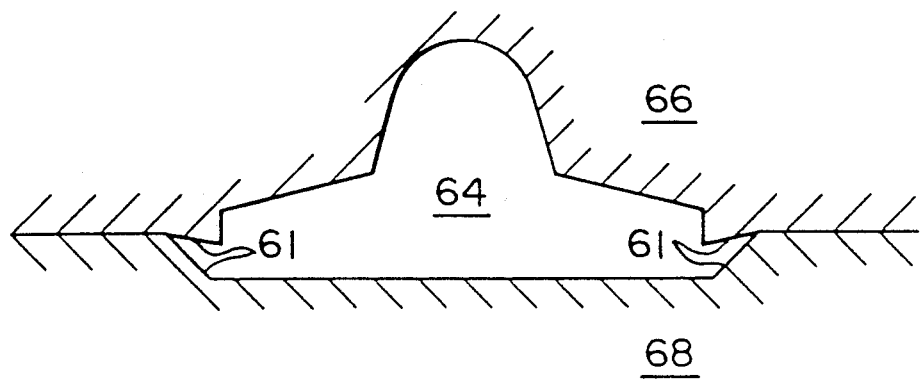
FIG. 3 is an axial cross-sectional view of a metal mold for the pivot in FIG. 2.

A modified form of the pivot 22 in FIGS. 1A and 1B is illustrated in FIG. 2, in which for preventing the pivot 22 more positively from separating from the top face 56 of the hub 50 during transportation, a plurality of nails 62 are integrally formed with the edge 25A of the circumferential flange 25 at equal angular intervals about the axis Z of the pivot 22 to project radially outwards and diagonally upwards. Although only two nails 62, 62 are shown in FIG. 2, more than two nails 62, 62, 62 ... may be provided. Such nails 62 may be easily formed by means of a metallic mold shown in FIG. 3, in which they are molded by portions 61, adjacent to the molding cavity 64, of the lands of the core side 66 and the cavity side 68 of the mold. The shape of the nails 62 may be thus easily changed by varying the shapes of the portions 61. When the circumferential flange 25 of the pivot 22 is placed within the annular projection 52, the nails 62 are brought into resilient contact with the inner circumferential face 52A (FIG. 1 B) of the annular projection 52 by resiliently deforming the nails 62, so that the pivot 22 is positively fastened to the hub 50 in position without separating from the top face 56 of the hub 50.

Figure 4:
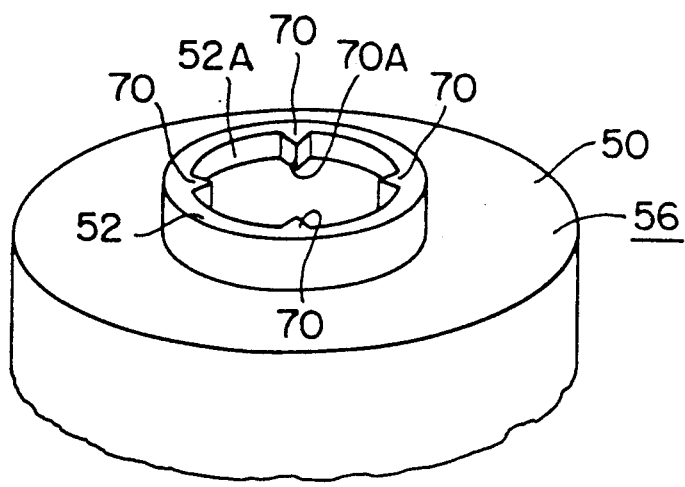
FIG. 4 is a fragmentary perspective view of a modified form of the hub of FIG. 1A.
Figure 5:
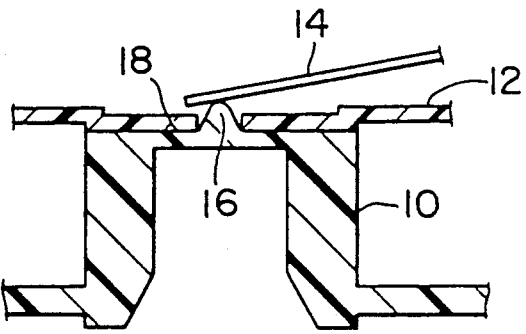
FIG. 5 is an axial cross-section of the central portion of a tape reel of the prior art with a polyacetal resin hub.

For more positively securing the pivot 22 to the annular projection 52, a plurality of ribs 70, four ribs 70 in this modified form, may be provided to the inner circumferential wall 52A of the annular projection 52 at equal angular intervals about the axis of the hub 50 as shown in FIG. 4. Each of the ribs 70 projects radially inwards and has a knife edge 70A at its inner extremity, each knife edge 70 directed radially inwards. When the pivot 22 fits into the annular projection 52, the knife edge 70A of each rib 70 is brought into resilient contact with t he edge 25A (or the corresponding nail 62) of the circumferential flange 25 of the pivot 22. Thus, even if there is an excessive dimensional dispersion of both the diameter of the circumferential flange 25 and the inner diameter of the annular projection 52, positive holding of the pivot 22 is performed by resiliently deforming the knife edge 70A of each rib 70, so that the pivot 22 is effectively prevented from being separated from the top face 56 or moving from the predetermined position within the annular projection 52.

For the purpose of molding the hub 50, a draft may be provided to the inner circumferential wall 52A of the annular projection 52. In this case it is unnecessary to provide a draft to the ribs 70. The ribs 70 with no draft effectively prevent the pivot 22 from separating from the top face 56 of the hub 50 when the pivot 22 fits in the annular projection 52.

The shape of the projection formed with the top face 56 of the hub 50 to hold the pivot 22 is not limited to the annular projection 52 in FIG. 4. A plurality of ribs may be formed with the top face 56 of the hub 50 by cutting off several portions of the annular projection 52 so as to surround the circumferential flange 25 of the pivot 22 when the flange 25 is placed in position on the top face 56 of the hub 50. For example, four ribs may be formed with the top face 56 of the hub 50 at positions to correspond to positions of respective ribs 70, 70, 70, 70 in FIG. 4 without forming the annular projection 52.

What is claimed is:

1. A tape reel for a cassette tape, comprising:
    (a) a hub, made of a synthetic resin, having a top face;
    (b) a pivot placed concentrically on the top face of the hub and having a head portion, a circumferential flange projecting radially outward from the head portion and nail means integrally formed with an edge of the circumferential flange to project radially outward and diagonally upward, the head portion adapted to be urged toward the top face of the hub by a leaf spring mounted to a casing of the cassette tape;
    (c) pivot holding means having an inner circumferential wall integrally formed with the top face of the hub, the pivot holding means for resiliently holding the circumferential flange of the pivot so that the pivot is placed concentrically on the top face of the hub; and
    (d) an upper flange having a center hole formed to allow the head portion of the pivot to pass therethrough, the upper flange being joined at the top face of the hub, and wherein the nail means of the pivot is brought into resilient contact with the inner circumferential wall of the pivot holding means by resiliently deforming the nail means for temporarily fastening of the pivot with the hub.

2. A tape reel as recited in claim 1, wherein the hub comprises an annular projection having an inner circumferential wall and a plurality of ribs formed with the inner circumferential wall thereof to project radially inward at equal angular intervals about an axis of the hub, each rib resiliently contacting the nail means when the circumferential flange of the pivot is downwardly placed within the inner circumferential wall of the annular projection of the hub.

3. A tape reel as recited in claim 2, wherein each of the ribs has a knife edge directed radially inward, each knife edge resiliently contacting the nail means of the pivot.

4. A tap reel as recited in claim 1, wherein the nail means comprises a plurality of nails at equal angular intervals about an axis thereof.

* * * * *